(12) United States Patent
Schneeberger

(10) Patent No.: US 7,042,731 B2
(45) Date of Patent: May 9, 2006

(54) MOUNTING DEVICE AND APPARATUS FOR MOUNTING DEVICE

(75) Inventor: Reinhold Schneeberger, Seukendorf (DE)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 10/722,435

(22) Filed: Nov. 28, 2003

(65) Prior Publication Data

US 2004/0165357 A1 Aug. 26, 2004

(30) Foreign Application Priority Data

Nov. 27, 2002 (DE) ................................ 102 55 490

(51) Int. Cl.
*H05K 5/00* (2006.01)

(52) U.S. Cl. .................... 361/724; 361/685; 312/223.1

(58) Field of Classification Search ................ 361/683, 361/724, 685; 312/223.1, 223.2
See application file for complete search history.

(56) References Cited

U.S. PATENT DOCUMENTS

| | | | |
|---|---|---|---|
| 3,821,688 A | | 6/1974 | Larsile |
| 4,979,909 A | * | 12/1990 | Andrews ..................... 361/685 |
| 5,680,293 A | * | 10/1997 | McAnally et al. .......... 361/685 |
| 5,777,848 A | * | 7/1998 | McAnally et al. ........ 312/223.2 |
| 5,940,265 A | * | 8/1999 | Ho .............................. 361/685 |
| 5,995,364 A | * | 11/1999 | McAnally et al. .......... 361/685 |
| 6,102,499 A | * | 8/2000 | Chen et al. ............... 312/223.2 |
| 6,227,632 B1 | * | 5/2001 | Liu .......................... 312/223.2 |
| 6,262,888 B1 | * | 7/2001 | Siedow et al. .............. 361/685 |
| 6,337,793 B1 | * | 1/2002 | Vier et al. ................... 361/685 |
| 6,341,059 B1 | * | 1/2002 | Kohler et al. ............... 361/685 |
| 6,418,011 B1 | * | 7/2002 | Omori ......................... 361/685 |
| 6,751,100 B1 | * | 6/2004 | Chen ........................... 361/683 |

FOREIGN PATENT DOCUMENTS

| | | |
|---|---|---|
| DE | 21 36 719 B2 | 7/1972 |
| DE | 38 79 353 T2 | 9/1988 |
| DE | 197 26 748 C2 | 2/1999 |
| EP | 0 933 853 A1 | 8/1999 |
| EP | 0 957 553 A1 | 11/1999 |

* cited by examiner

*Primary Examiner*—Lisa Lea-Edmonds
(74) *Attorney, Agent, or Firm*—Sughrue Mion, PLLC

(57) ABSTRACT

A mounting device (1), an apparatus (20) and an assembly system for apparatuses (20, 50) including those with a greater weight, whereby the individual parts can be interconnected using simple tools. The apparatuses (20, 50) are hooked into a profile (5, 7, 8) of a mounting device (1) and are then secured onto a mounting rail (6) of the mounting device (1). The mounting device (1) has two integrated cable channels (12, 13) so that cables which are subject to interference, such as power supply cables, are accommodated separately from sensitive cables, such as data transmission cables, and can be protected from ambient influences. The mounting device (1) is provided with a front panel (6) as a cover. The design of the mounting device (1) with the front panel (6) as a closed unit offers a high level of EMC and ESD protection, in addition to good protection against ambient conditions and weather conditions, in particular moisture and dust. Electric connections of the individual apparatuses (20, 50) to one another are established easily through the use of plugs (26) arranged on the sides of the apparatuses when the apparatuses (20, 50) are configured to be placed side by side in the mounting device (1) in a precisely defined position. Modules in the interior of the apparatuses (20, 50) may thus be interconnected directly without needing additional bus lines and/or bus modules.

27 Claims, 6 Drawing Sheets

MOUNTING DEVICE AND APPARATUS FOR MOUNTING DEVICE

The following disclosure is based on German Patent Application No. 10255490.0, filed on Nov. 27, 2002, which is incorporated into this application by reference.

FIELD OF AND BACKGROUND OF THE INVENTION

This invention relates to a mounting device and an apparatus configured to be mounted in the mounting device. The invention also relates to a system including either or both the apparatus and the mounting device.

Apparatuses, in particular electric and/or electronic apparatuses, automation equipment in particular, such as programmable controllers (SPS), etc., are often combined as modules in modular systems, and mounted at their site of use. To do so, the modules are usually inserted into a modular system and locked in place there, each individual module being secured in a housing. These apparatuses are mounted directly on a mounting wall, for example, in particular by screwing them in place or snapping them onto standard rails, e.g., C rails or top-hat rails. However, these simple standard rails can hold only lightweight apparatuses. In addition, separate cable channels must also be provided for the wiring for the power supply, for example, as well as for the digital and/or analog inputs and outputs of the apparatuses plus any additional communication cables required. It is often necessary to take other complex and cost-intensive additional measures in order to separate cables that cause interference, such as power supply cables, from sensitive cables, such as data transmission cables, while also protecting the cables from adverse ambient conditions.

Furthermore, additional cable connections, e.g., bus lines, are necessary for electric connection, such as communications connections, of individual apparatuses, and these in turn have a potentially high susceptibility to interference and therefore may increase the maintenance complexity disproportionately.

German Patent DE 197 26 748 C2 discloses a miniature housing for wall mounting having a housing bottom part that can be covered with a cover. The housing bottom part is designed as an extruded profile having guide grooves and/or mounting grooves, which are molded in the bottom part of the housing and face toward the interior of the housing.

Laid-Open German Patent Application 21 63 719 discloses a mounting frame for electric installation purposes, having window-like openings side by side to accommodate electric installation devices and having a metallic cover to be provided on the front side thereof.

German Patent 38 79 353 T2, which is the translation of European Patent 0 311 654 B1, discloses a device for connecting a plurality of preferably rack-like profiles for electric cable line or duct systems having at least a pair of grooves running parallel one above the other, into which can be fitted a profile connecting element for bridging the connection and thus for establishing the connection.

OBJECTS OF THE INVENTION

Therefore, one object of this invention is to provide a mounting device for an apparatus, an apparatus, and a system having such a mounting device and preferably at least one such apparatus, which will facilitate and improve the assembly, mounting and protection of the individual components.

SUMMARY OF THE INVENTION

This and other objects are achieved, according to one formulation, by a mounting device that includes at least one plate; a profile extending from the plate in an upper region of the plate; and a mounting rail extending from the plate in a lower region of the plate. The profile is configured for attaching an electronic apparatus and the mounting rail is configured for securing the apparatus, wherein the profile includes a profile part which is connected to the plate, a first profile web, and a second profile web. The first profile web and the second profile web each extend from the profile part. The second profile web is arranged in a first region of the profile part distal from the plate. The first profile web is arranged in a second region of the profile part between a third region of the profile part, where the profile part is connected to the plate, and the first region. The first profile web and the second profile web are arranged on opposite sides of the profile part.

According to another formulation, the invention is directed to a system having a mounting device for at least one apparatus, which has at least one plate; a profile which is arranged perpendicular to the plate in a first half of the plate; and a mounting rail which is situated perpendicular to the plate in a second half of the plate. The profile is configured for attaching the apparatus and the mounting rail is configured for securing the apparatus. The profile includes a profile part which is connected to the plate, a first profile web, and a second profile web. The first profile web and the second profile web are each arranged essentially perpendicular to the profile part, the second profile web being connected to a region of the profile part facing away from the plate, and the first profile web being connected to the profile part between a region of the profile part with which the profile part is connected to the plate and the second profile web. The first profile web and the second profile web are arranged on opposite sides of the profile part.

The first half of the plate is the part of the plate which is in the upper area of the plate, based on mounting the plate on the receptacle, for example a wall, when the plate is mounted on a receptacle. The first half of the plate is thus also referred to below as the upper half of the plate. By analogy with this, the second half of the plate is also referred to below as the lower half of the plate.

The use of the terms "upper" and "lower" and/or derivations of these terms in conjunction with other features of this invention refer below to the same spatial arrangement with respect to mounting on a receptacle, for example, a wall, as that described in the definition of the first and second halves of the plate.

According to a first embodiment of this invention, the mounting device has an upper cover and/or a lower cover, the upper cover and/or the lower cover being connected to the plate. Due to the upper and lower covers which are connected to the plate, the mounting device may be provided very easily with another plate as a cover. This expands the mounting device to form a housing, supplemented, as needed, on both end faces with punched parts that are simple to manufacture, and thus providing protection from ambient influences for the components which are in the interior of the housing.

According to another preferred embodiment of this invention, the profile has a rectangular design, with a first profile web running parallel with the plate in the direction of the lower cover. In addition, the profile has a second web, the second web running in parallel to the plate and facing the upper cover. It is especially advantageous that the second profile web is situated at the end of the profile. The first profile web which runs parallel to the plate in the direction of the lower cover forms an interspace between the plate and the first profile web, such that an apparatus having an apparatus web which fits it can be inserted into this interspace without any additional aids and can be clamped there. The apparatus attached in the profile is then beneath the profile. The second profile web which runs in parallel with the plate and points in the direction of the upper cover results in formation of a channel between the plate, the second profile web and the upper cover, this channel being suitable in particular for accommodating cables, e.g., sensitive cables, other cables, etc. It is especially advantageous that the second profile web be situated at the end of the profile, because the resulting channel then assumes the largest possible volume and can accommodate a larger number of cable strands as needed.

According to a particularly advantageous embodiment of this invention, the profile is designed to be suitable for manufacturing in one piece. This one-piece design permits mass production and thus inexpensive fabrication. The profile may extend over the width of the plate, but it is equally possible, e.g., to mount identically shaped parts of such a profile in suitable locations, e.g., at regular intervals on the plate. In this way, instead of a single profile mounted throughout the entire plate, identically shaped profile parts are distributed on the plate accordingly.

According to another advantageous embodiment of this invention, the mounting rail consists of two parallel rails mounted on the plate with a distance between them. Such a mounting rail makes it easy to establish a standardized distance between the individual rails, facilitating attachment of an apparatus, which sits on the mounting rail by means of e.g. conventional mounting means, such as screws, in the mounting rail.

According to another very advantageous embodiment of this invention, the mounting device has an upper channel formed by the upper cover, the plate and the profile. In addition, the mounting device has a lower channel, which is formed by the lower cover, the plate and an apparatus attached in the mounting device. In addition, the upper channel and the lower channel can each be used as cable-carrying channels. Such an inventive arrangement of the mounting device and an apparatus attached therein automatically results according to this invention in two separate channels situated a distance apart from one another, each being suitable for accommodating cables, thus making it very simple to separate power supply cables, for example, from data transmission cables. Thus, with appropriate guidance and separation of the cables, this largely prevents any mutual influence, e.g., due to interference signals from the power supply cables, which could have a negative influence on fault-free data transmission.

According to another advantageous embodiment of this invention, the upper cover and the lower cover are each designed to be bent at an angle, with the upper cover having a first web which runs essentially perpendicular to the upper cover and essentially parallel to the plate, extending in the direction of the lower cover, and which is arranged at the end of the upper cover. Thus, this web is not connected to the plate. The lower cover has a second web which is essentially perpendicular to the lower cover, and runs essentially parallel to the plate, extending in the direction of the upper cover. This second web is situated on the end of the lower cover, which end is not connected to the plate. With this embodiment, the mounting device is prepared for accommodating a front panel, which serves as a cover or faceplate, in a simple and inexpensive manner.

According to another extremely advantageous embodiment of this invention, the mounting device can be designed in one piece as an extruded aluminum profile. The mounting device can thus be manufactured inexpensively as a mass-produced product in any desired length and can be cut very easily to the desired length in accordance with requirements. This yields cost advantages in particular due to the fact that the profile as well as the mounting rail need not be mounted separately on the plate, e.g., by welding, gluing, etc.

According to another advantageous embodiment of this invention, the mounting device has a front panel, which essentially forms a housing together with the plate and the upper and lower covers. In addition, the front panel has an upper profile and a lower profile, which are designed in such a way that the front panel can be pushed onto the mounting device by means of the upper and lower profiles and by means of the first web of the upper cover and the second web of the lower cover of the mounting device. Smooth and easy attachment of the front panel to the mounting device is possible with appropriate and accurately fitted manufacture of the corresponding profiles and/or webs on the front panel and/or the bottom and/or lower covers, thus essentially forming a housing. This can be expanded as needed to form a complete housing by adding simple-to-manufacture punched parts on the two end faces, thereby effectively protecting the apparatuses in the interior of the housing thus formed, attached in the profile and mounted on the mounting rail. As a result, the apparatuses are protected not only from ambient effects, such as moisture and dust, but also from interference of an electric and/or magnetic type, thus offering a high electromagnetic compatibility (EMC) and high protection from electrostatic discharge (ESD). In addition, so-called EMC springs can be contacted to the mounting device by means of fastening devices, to thereby dissipate to the outside and thereby discharge such interference signals.

In addition, in another embodiment, the upper plate can be removed easily and conveniently by pushing it away for maintenance purposes to allow rapid access to the apparatuses that are to be tested. Additional advantages can be achieved through the material, such as aluminum, used to manufacture the mounting device. In particular due to the high thermal conductivity of aluminum, the entire mounting device including the upper plate may be used as a heat sink to dissipate high component temperatures and/or device temperatures. By displacement of these physical properties—such as high thermal conductivity, EMC protection and protection from electrostatic discharge (ESD), shock protection and protection against weather influences—to an extruded aluminum profile that can be manufactured inexpensively, the actual housing of the apparatuses to be attached in the mounting device, including the individual modules, can be limited to an inexpensive material and a very simple design accordingly, which thereafter involves only the mounting of the modules themselves.

Objects of the present invention are achieved also by an apparatus, which has an apparatus web extending along essentially a full length of at least a first apparatus side and configured to engage a mounting device, and at least one fastening device provided on a second apparatus side, the fastening device configured to attach the apparatus to the mounting rail.

According to another preferred embodiment of this invention, the apparatus web protrudes out of the respective lateral plane of the apparatus. In addition, the fastening device protrudes out of the respective lateral plane of the device and is essentially designed in the shape of a cube, with the fastening device being designed to accommodate a fastener. In addition, it is particularly advantageous that the apparatus web and the fastening device are situated on opposite sides of the apparatus. Due to the inventive design of the apparatus having an apparatus web and a fastening device on the opposite side of the apparatus in particular, it is readily possible without any great effort for even a non-technical person to mount an apparatus in a profile prepared to accommodate the apparatus and to mount it on a mounting rail, e.g. using a simple tool and conventional mounting means passed through an advantageous recess in the fastening device of the apparatus.

Preferably, the apparatus web has essentially a square cross section, for example. Any other cross sections and shape are of course also possible for the apparatus web. Due to the particularly advantageous design and position of the apparatus web, the center of gravity of the apparatus, especially on insertion of the apparatus web into a profile provided for this purpose, in relation to the insertion point, i.e., the fulcrum about which the apparatus is rotated downward, is situated so that the apparatus automatically tilts about a mounting rail provided for this purpose and remains in this position, so that attachment of the device without any manual restraint is accordingly made possible, and thus mounting of the device is greatly simplified. Conversely, in the event of a problem, the respective apparatus can be removed very quickly. For example, it is particularly advantageous for an apparatus to be equipped with two mounting devices, one accommodated at one end and the other at the other end of the respective side, because this yields an especially stable position of the apparatus.

According to a particularly advantageous embodiment of this invention, the apparatus has at least one upper plug connection which is located on the side of the apparatus on which the apparatus web is situated and/or it has a lower plug connection which is located on the side of the apparatus on which the fastening device is located. Due to such an arrangement, i.e., outfitting of an apparatus with an upper and/or lower plug connection, the apparatus is optimally prepared for insertion into a corresponding mounting device according to this invention, because this ideally ensures access to the upper channel and/or lower channel of the mounting device, and only minimal cable lengths must be installed. The cable can be connected to the apparatus itself very quickly and easily due to an upper and/or lower plug connection prepared in this way, thus saving time in installation and/or removal and assembly of such modules. In addition, it is of course also possible to design the apparatus so that it has neither an upper nor a lower plug connection but instead has only one or more lateral plug connections.

According to another preferred embodiment of this invention, the apparatus has at least one first lateral plug connection, which is arranged on one of the sides of the apparatus perpendicular to the side having the apparatus web. In addition, it is extremely advantageous that the lateral plug connection is provided for direct connection to another apparatus. It is of course possible for the apparatus to have a plurality of plug connections on different sides of the apparatus. It is advantageous in particular if the lateral plug connections are provided on the sides of the apparatus which are perpendicular to the plate after the apparatus has been attached in an inventive mounting device, because then any number of additional devices can be attached in the mounting device to the right and/or left of the apparatus already attached there and can be connected directly to one another quickly and easily by means of the lateral plug connections.

This is made possible in particular by the fact that the mounting device ensures a precisely defined position of the apparatuses in relation to one another and thus electric connections can be implemented among the individual apparatuses and/or modules without any complex additional bus modules and/or connecting cables. This makes it possible to completely eliminate additional bus lines and/or other current-carrying cables between the apparatuses. In addition, in the event of trouble, apparatuses can be removed very easily and quickly from the connection and replaced.

According to another advantageous embodiment of this invention, the apparatus has at least one first signaler by which information regarding the current operating state of the apparatus can be displayed. It is particularly advantageous that an LED is provided as the signaler. Due to such signaler, which may also be designed as acoustic signaler, e.g., alarm indicators, for example, it is very easy to signal information regarding the current operating state of the apparatus and thus identify the defective apparatus in the event of a fault and replace it. In addition, it is of course also possible and conceivable to have any other signaler and/or display of any other information regarding the current operating status of the apparatus. For example, digital display of operating states is also possible. In addition, as an alternative or in addition to the signaler, the device may also have one or more operating elements, such as a keyboard, switches, etc., thus permitting separate and individual control and/or triggering of the modules in the apparatus.

In addition, the apparatus may also be provided with venting and/or aerating ports. The sides of the apparatus, which are provided with the upper and/or lower plug connections, are preferably equipped with the venting and/or aerating ports, because this facilitates circulation of air through the upper and/or lower channels. However, the apparatus may also be designed with venting and/or aerating ports in any other locations.

BRIEF DESCRIPTION OF THE DRAWINGS

Preferred exemplary embodiments of this invention are explained in greater detail below with reference to the drawings, wherein.

DETAILED DESCRIPTION OF THE PREFERRED EMBODIMENTS

Figure 1:
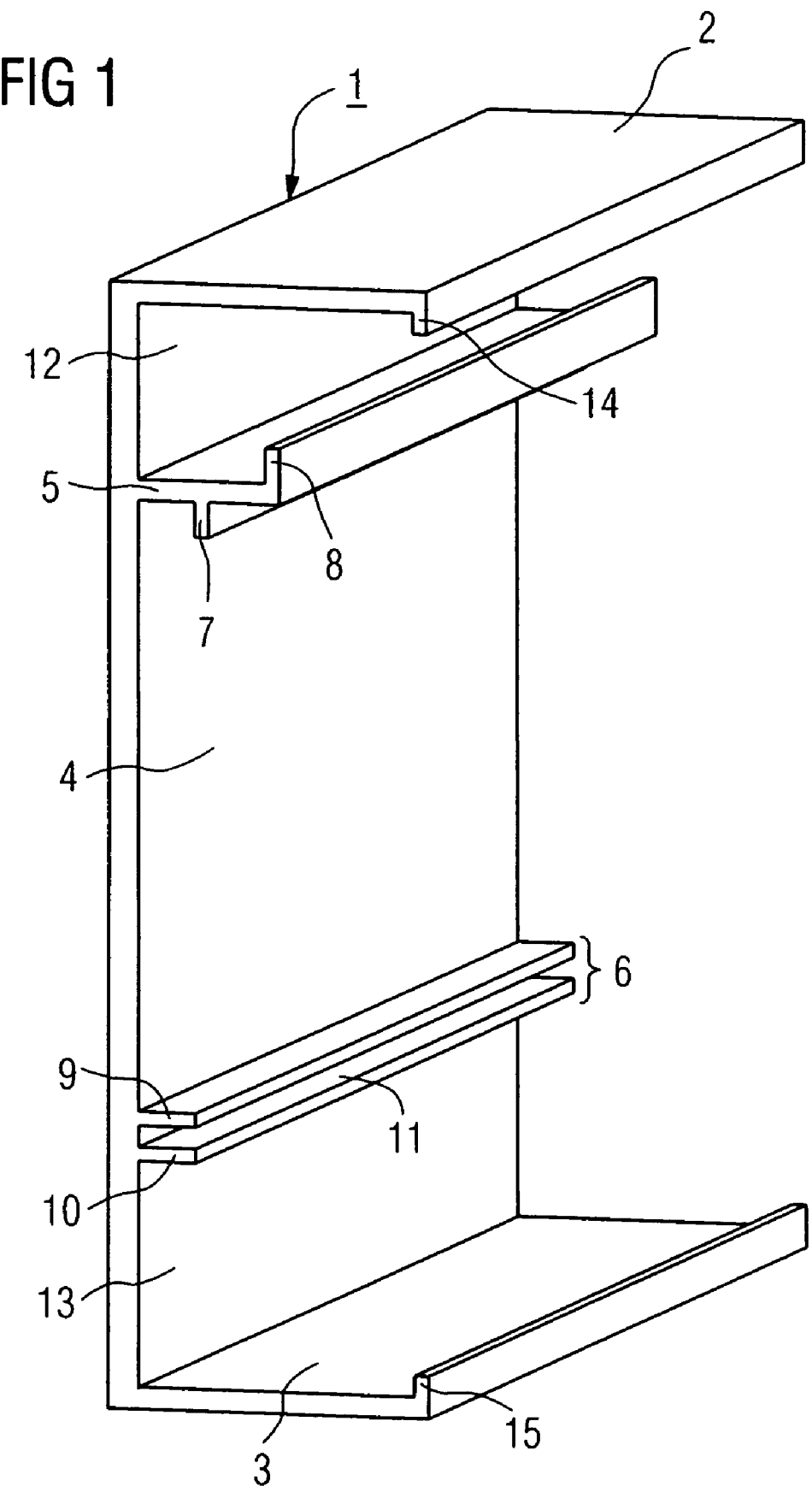
FIG. 1 shows an exemplary embodiment of an inventive mounting device.

FIG. 1 shows an exemplary embodiment of an inventive mounting device 1. The exemplary mounting device 1 consists of a plate 4, an upper cover 2, a lower cover 3, a profile consisting of a profile part 5, a first profile web 7 and a second profile web 8, plus a mounting rail 6. The present embodiment of the mounting device 1 is designed, for example, in one piece as an extruded aluminum profile. It is of course also possible to fabricate the individual components separately and to join them together using a wide variety of techniques such as welding, gluing, etc. to yield the form of the mounting device 1 shown here. The upper cover 2 is connected to the plate 4 at one end. The lower cover 3 is also connected to the plate 4 at another end. The upper cover 2 and the lower cover 3 are each connected to the plate 4 at a right angle in the example shown here and are designed so they are bent at an angle. It is also quite possible and conceivable for the upper cover 2 and the lower cover 3 to deviate from the right-angle arrangement shown here, depending upon the application, and to assume other angles in relation to the plate 4, and to be connected to the plate 4 in accordance with these angles.

In addition, the upper cover 2 has a web 14, which points essentially at a right angle to the upper cover 2, essentially parallel to the plate 4 in the direction of the lower cover 3. The web 14 is situated at the end of the upper cover 2 that is not connected to the plate 4. The web 14 shown here is again arranged at a right angle to the upper cover 2 in this example. Here again, it is also possible to deviate from the right angle arrangement, depending on the application. The same thing is also true of the lower cover 3, which has a web 15 that also points essentially at a right angle to the lower cover 3, essentially parallel to the plate 4 in the direction of the upper cover 2 and is arranged at the end of the lower cover 3 that is not connected to the plate 4.

In addition, the mounting device 1 illustrated in FIG. 1 has a profile 5, which in the upper half of the plate 4 is connected to the plate 4 in parallel with the upper cover 2. The profile 5 is designed to be rectangular and, in the example shown here, has two profile webs. The first profile web 7 runs parallel to the plate 4 in the direction of the lower cover 3, and the second profile web 8 runs parallel to the plate 4 in the direction of the upper cover 2. The second profile web 8 is mounted on the end of the profile 5 that is not connected to the plate 4. The first profile web 7 is situated on the profile 5 between the plate 4 and the second profile web 8. Other positions on the profile 5 are of course feasible here for both profile webs 7 and 8. Bordered by the plate 4, by the upper cover 2 and by the profile 5 with the second profile web 8, this results in an upper channel 12, which is suitable in particular for accommodating cables. It is of particular advantage here that the second profile web 8 is mounted on the end of the profile 5, because in this way the upper channel 12 assumes the largest possible dimensions and thus has a greater amount of space accordingly for accommodating cables.

In addition, due to the first profile web 7, which is also on the profile 5, an interspace is formed between the plate 4 and the profile web 7. In the example shown, the profile 5 is fabricated in one piece, and the web 7 extends across the entire plate 4. The resulting interspace is configured for inserting a mating web of suitable dimensions. Such a mating web is implemented as an apparatus web 21 on an apparatus 20, for example, as illustrated in FIG. 2, where the apparatus 20 can be inserted into this interspace by means of such an apparatus web 21.

In addition, the mounting device 1 has a mounting rail 6, which is connected to the plate 4 in the lower half of the plate 4 and extends parallel to the lower cover 3 over the entire width of the plate 4. The mounting rail 6 consists of two rails 9 and 10, which are parallel to one another with a distance 11 between them. The distance 11 is advantageously of such dimensions that it is suitable to accommodating conventional fastening means such as screws. The mounting rail 6 is thus prepared accordingly for securing an apparatus which is introduced into the mounting device 1 by means of the profile 5. The distance between the profile 5 and the mounting rail 6 may be taken into account accordingly as needed, i.e., depending on the size of the apparatus to be attached in it. Thus, a lower channel 13, which like channel 12 is suitable for accommodating cables, is formed by the plate 4, the lower cover 3 and an apparatus attached to, i.e., secured on the mounting rail 6.

Figure 2:
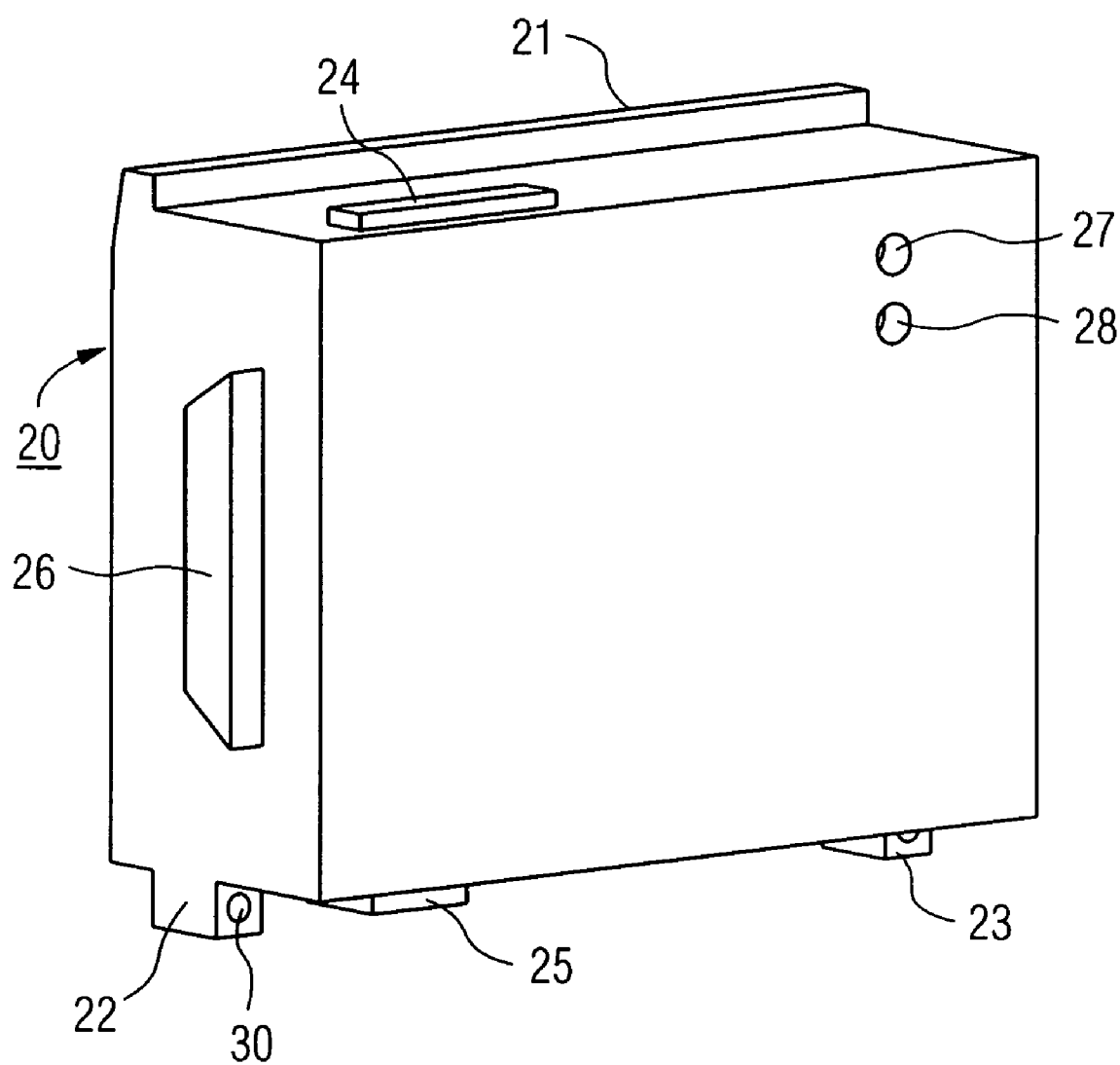
FIG. 2 shows an exemplary embodiment of an inventive apparatus.

FIG. 2 shows an exemplary embodiment of an inventive apparatus 20. The exemplary embodiment of an apparatus 20 illustrated in FIG. 2, in particular an electric apparatus, is designed essentially with a cubicle shape. The apparatus 20 has an apparatus web 21 on one side, this apparatus web being mounted on one end of the respective side of the apparatus 20 and extending over the entire width of the apparatus, for example. The apparatus web 21 protrudes out of the respective lateral plane of the apparatus 20, has an essentially square cross section, for example, and is suitable and intended for insertion into a profile 5 of the mounting device 1 from FIG. 1, for example. Other suitable cross sections and shapes for the apparatus web 21 are of course also possible. In addition, it is also conceivable for the apparatus web 21 to be composed of a plurality of e.g. identically shaped parts which are distributed over the lateral width of the apparatus 20, so that the apparatus web 21 does not extend completely over the entire width of one side of the apparatus 20.

In addition, the apparatus 20 has fastening devices 22 and 23, which are on the side of the apparatus 20 opposite the apparatus web 21. The fastening device 22 is situated on the one lateral edge of the respective side, and the fastening device 23 is situated on the other lateral edge of the respective side of the apparatus 20. It is also conceivable and possible to equip an apparatus 20 with only one fastening device or with more than two fastening devices 22, 23. The positions of the fastening devices 22, 23, which are shown in FIG. 2, are shown only as examples and may of course also be varied as desired. However, the positions at the edge of the side are particularly advantageous because this yields a particularly stable position of the apparatus in the fixed state.

The exemplary fastening devices 22 and/or 23 shown here protrude out of the respective lateral plane of the device 20 and are designed in the form of cubes, with the fastening devices 22 and 23 being equipped for accommodating a fastening means, which is indicated at the recess 30, for example. Such a recess 30 is advantageously dimensioned so that it is suitable for accommodating conventional commercial fastening means, in particular screws. The fastening device may of course have any desired design. With the help of the fastening devices 22 and 23, the apparatus 20 can be screwed and/or secured onto the mounting rail 6 of the mounting device 1 illustrated in FIG. 1. It is especially advantageous that the apparatus web 21 and the fastening devices 22 and 23 are situated on opposite sides of the apparatus 20 because this ensures a particularly stable position of the apparatus after being attached and secured in a mounting device 1 as illustrated in FIG. 1.

In addition, the apparatus 20 has, for example, an upper plug connection 24, a lower plug connection 25 and a lateral plug connection 26, as well as one additional side connection, which cannot be seen from the perspective illustrated here, on the opposite side by analogy with the position of the lateral plug connection 26. The upper plug connection 24 is situated advantageously on the side of the apparatus 20 where the apparatus web 21 is also situated. This has particular advantage with regard to attaching and securing the apparatus 20 in a mounting device 1 according to FIG.

1, since access to a corresponding upper channel 12 is then very easily possible. The same thing is also true of the position of the lower plug connection 25, which is advantageously situated on the side of the apparatus where the fastening devices 22 and 23 are also situated. Therefore the lower channel 13 of the mounting device 1 of FIG. 1 is also readily accessible. Appropriate cables can be connected separately to the apparatus 20 according to certain criteria by using the two separate plug connections, the upper plug connection 24 and the lower plug connection 25. Thus in particular cables which cause interference, e.g., the electric power supply cables, can be connected to the apparatus 20 via the lower plug connection 25, while sensor cables and/or communication cables are connected to the apparatus 20 via the upper plug connection 24. It is thus possible to automatically, rapidly and easily implement a separation of cables that cause interference from sensitive cables.

The lateral plug connection 26 and/or the other side connection which is not visible but is on the opposite side of the apparatus 20 is/are provided in particular for directly connecting additional apparatuses at the right and/or left of the apparatus 20 shown here. This eliminates any expensive and complicated intermediate cabling between the apparatuses to be connected. The form of the plug connections 25, 26, 27 shown here is of course given only as an example. All commercially available plug connections may be fitted and/or installed into the apparatus 20 and/or the housing of the apparatus 20 in intended, i.e., desired, positions accordingly. The apparatus 20 shown here can be manufactured in particular in various widths.

In addition, the apparatus 20 has signalers 27 and 28 by which information regarding the current operating state of the apparatus can be displayed. The signal means 27 and 28, shown here as recesses in the housing of the apparatus 20, may be designed, for example, as light-emitting diodes having different colors or the same colors, and are provided for display of different functions. The modules in the interior of the apparatus 20 that are not relevant for the present invention and are not shown here for the sake of simplicity may thus signal corresponding information about their operating states to the outside via the signalers 27 and 28. The number of signalers 27 and 28 shown here is of course intended only as an example. It is quite conceivable for no signaler or only a single signaler 27, in particular a light-emitting diode, or any desired number of signalers to be mounted on the apparatus 20 accordingly. The display, i.e., signaling of information, in particular operating states of the apparatuses, implemented by using optical signalers 27 and 28 in the example of FIG. 2 is also conceivable and possible via acoustic signal generators or other alternative display means, for example, analog or digital LCD displays and/or modules. In addition, it is also possible to equip the apparatuses alternatively or additionally to the signal means with one or more operating elements, such as a keyboard, switches, etc., so that separate, individual control and/or triggering of the modules in the apparatuses is possible.

In addition, it is also possible to provide the apparatus 20 with venting and/or aerating ports which are not shown in the embodiment illustrated here for reasons of simplicity. The sides of the apparatus 20 which are provided with the upper plug connection 24 and/or the lower plug connection 25 are preferably equipped with the venting and/or aerating ports because this permits appropriate circulation of air through the upper channel 12 and/or the lower channel 13. However, the apparatus 20 may also be designed with venting and/or aerating ports on any desired other sides.

Figure 3:
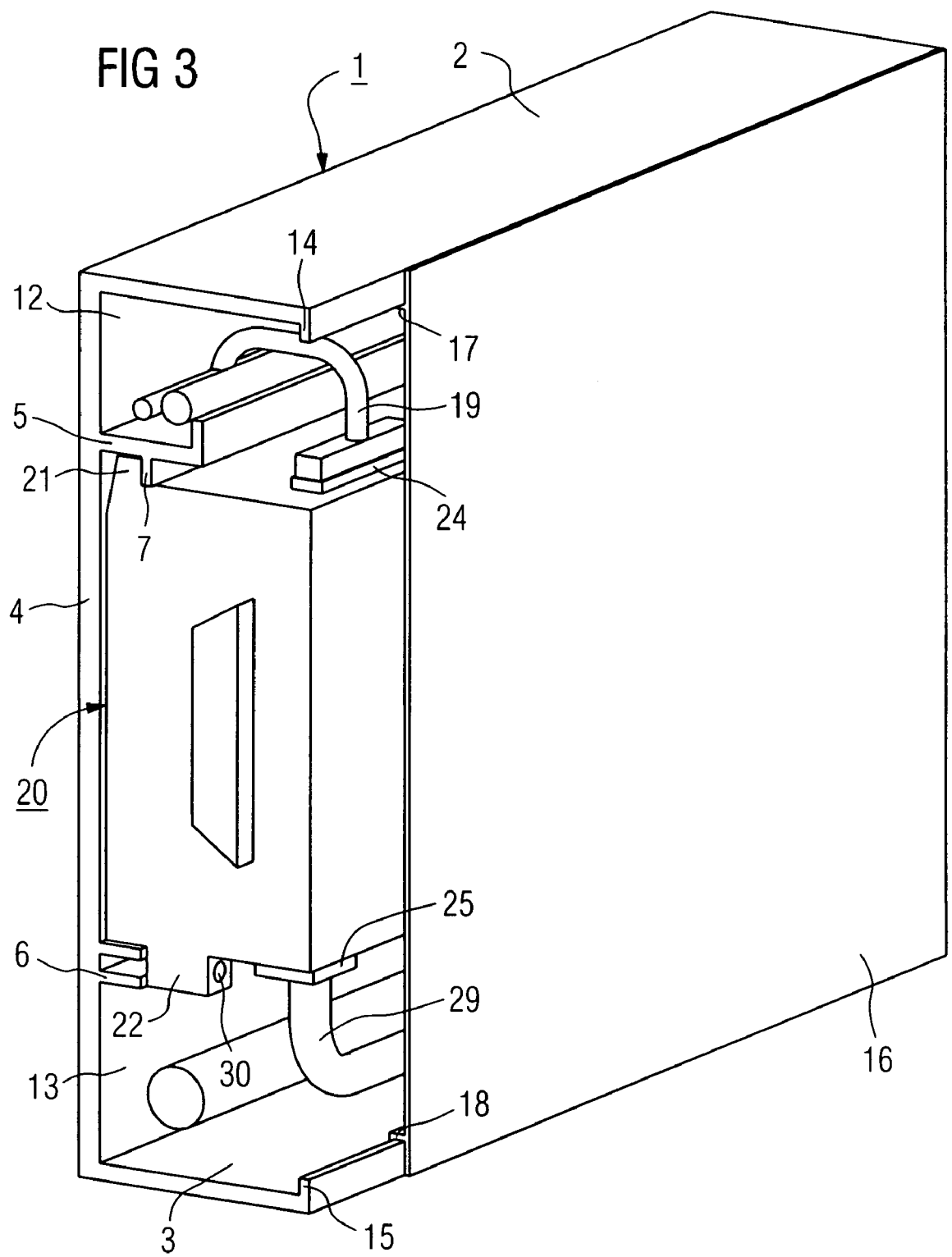
FIG. 3 shows an exemplary embodiment of the inventive mounting device with an inventive apparatus attached in it and an upper plate that can be pushed onto it.

FIG. 3 shows an exemplary embodiment of the inventive mounting device 1 with the apparatus 20 attached in it and with the upper plate 16 which can be pushed onto it. The apparatus 20 is inserted by means of the apparatus web 21 into the interspace between the plate 4, the profile 5 and the first profile web 7 and is secured on the mounting rail 6 by means of the fastening device 22 and the fastening device 23, which is not visible in the view shown in FIG. 3. The fastening means required for this purpose, such as screws, etc., which are secured on the mounting rail 6 through the recess 30, are not shown for reasons of simplicity.

In addition, the figure also shows the upper channel 12, which is formed by the plate 4, the upper cover 2 and the profile 5 as well as the lower channel 13, which is formed by the plate 4, the lower cover 3 and the attached apparatus 20. In addition, the cables in the upper channel 12 and the lower channel 13, in particular cables 19 and/or 29 are also shown. For example, the cables that cause interference, power supply cables in particular, are accommodated in the lower channel 13, whereby in addition the connection of the cable 29 to the apparatus 20 via the lower plug connection 25 is also shown. Sensitive cables, e.g., those for data communication, are carried in the upper channel 12, with the connection of the cable 19 to the apparatus 20 via the upper plug connection 24 being shown here as an example.

In addition, the figure also shows the front panel 16 which has an upper profile 17 and a lower profile 18, which are designed so that the front panel 16 can be pushed onto the mounting device 1 itself by means of the upper profile 17 and the lower profile 18 and by means of the first web 14 of the upper cover 2 and by means of the second web 15 of the lower cover 3 of the mounting device 1. Due to the corresponding design of the profiles 17 and 18, it is very easy to push this plate onto the mounting device, so that the mounting device together with the front panel forms essentially a housing after being pushed into position. Punched parts that are simple to manufacture may be attached as needed as a closure to the two remaining open side end faces. In combination with the front panel 16, these punched parts supplement the mounting device 1 to form a complete housing. Another advantageous embodiment is also, for example, the direct connection of the cables in the upper channel (12) and/or the lower channel (13) to others which are arranged at a right angle and are situated to the right and left of the apparatus 20 and/or the mounting device 1.

By means of a housing, which is complete in this way, the apparatuses in the interior, in particular apparatus 20, as well as the corresponding cables, in particular cable 29 for the power supply, for example, and/or cable 19 for data communication, for example, are effectively protected from ambient influences. At the same time, it is very easy to remove the front panel 16 for maintenance work and/or in the event of failure of the apparatus 20, thus ensuring rapid and easy access to the apparatuses mounted in the device, in particular apparatus 20.

By using appropriate materials for the mounting device 1 as well as for the front panel 16, such as aluminum, which has a high thermal conductivity, the housing thus formed may be used as a whole as a heat sink for dissipating high component temperatures, i.e., device temperatures, in particular of apparatus 20. In addition, the housing shaped in this way forms a closed unit which offers not only protection from weather influences and/or additional ambient influences, e.g., moisture and dust, but also a high degree of EMC and ESD protection. Thus, for example, for dissipation of interference signals, so-called EMC springs may be contacted from the fastening means, with which the apparatus 20 is attached to the mounting rail 6 of the mounting device 1, to the mounting rail 6. By displacement of physical properties such as thermal conductivity, EMC protection and electrostatic shock protection to the mounting device 1, which can be manufactured inexpensively in one piece as an extruded aluminum profile, for example, the housing of the apparatus 20 can be manufactured even by using inexpensive parts. Manufacture includes only the mounting of the modules in the interior of the apparatus 20 in addition to the plug connections and/or fastening means and/or instrument web already presented.

Figure 4:
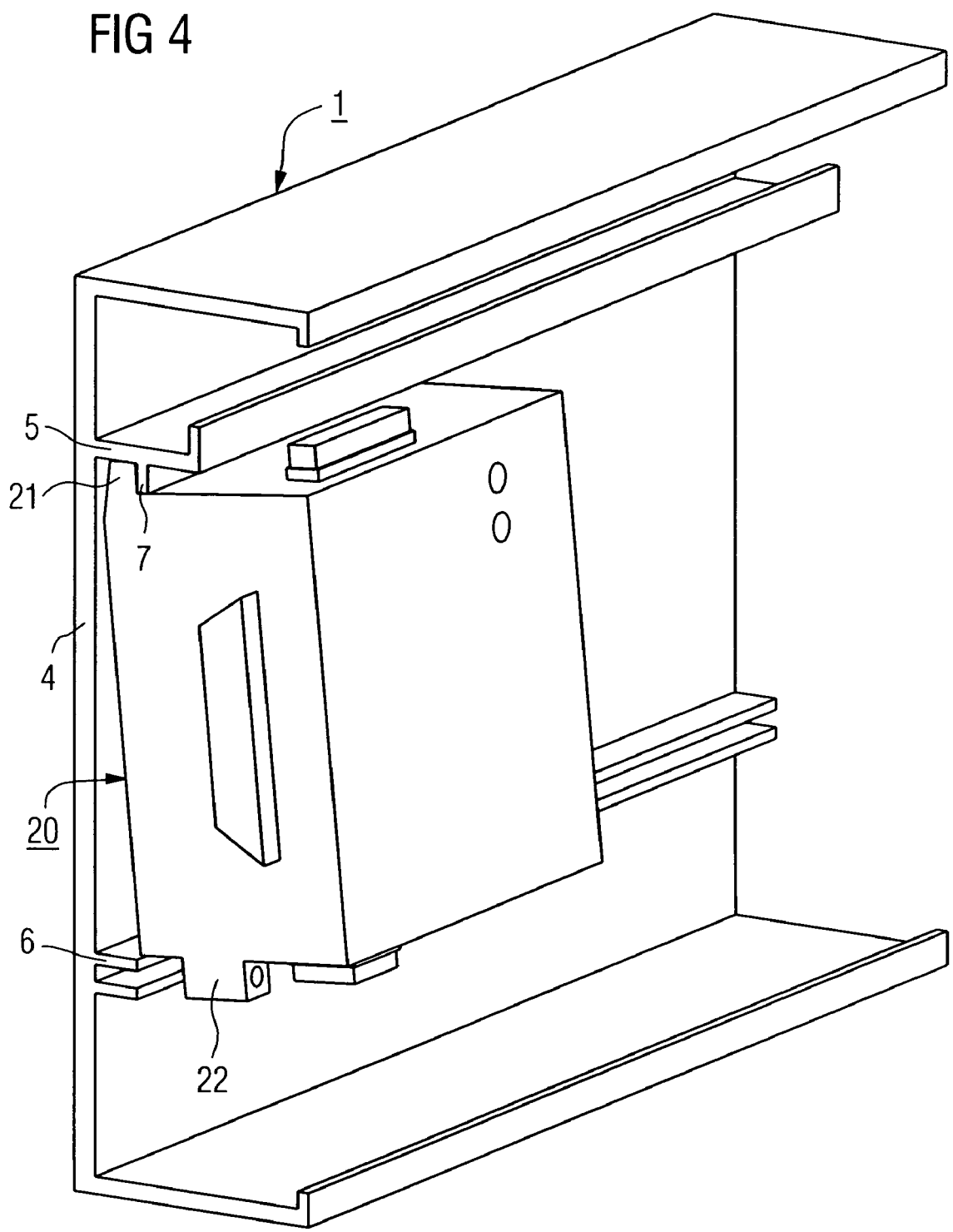
FIG. 4 shows an exemplary embodiment of an inventive apparatus attached in the inventive mounting device.

FIG. 4 shows how an exemplary embodiment of an inventive apparatus 20 is attached in the mounting device 1. The apparatus 20 is inserted obliquely from beneath with the device web 21 guided into the interspace between the plate 4 and the first profile web or profile web 7 of the profile 5 and tilted downward so that the fastening device 22 as well as the fastening device 23, which is not visible in FIG. 4, comes to rest on the mounting rail 6. The device web 21, on the side of the apparatus 20 that comes closest to the plate 4, is advantageously beveled to facilitate insertion of the apparatus 20 into the mounting device 1. Due to the particularly advantageous embodiment and position of the device web 21, the center of gravity of the apparatus 20, in particular when the device web 21 is inserted into the interspace between the plate 4 and the first profile web 7 of the profile 5 to the insertion point, i.e., the fulcrum about which the apparatus 20 is tilted downward, is located in relation to it so that the device automatically snaps onto the mounting rail 6 and remains in this position so that it is possible to secure the apparatus 20 without any manual restraint. This greatly facilitates the assembly.

Figure 5:
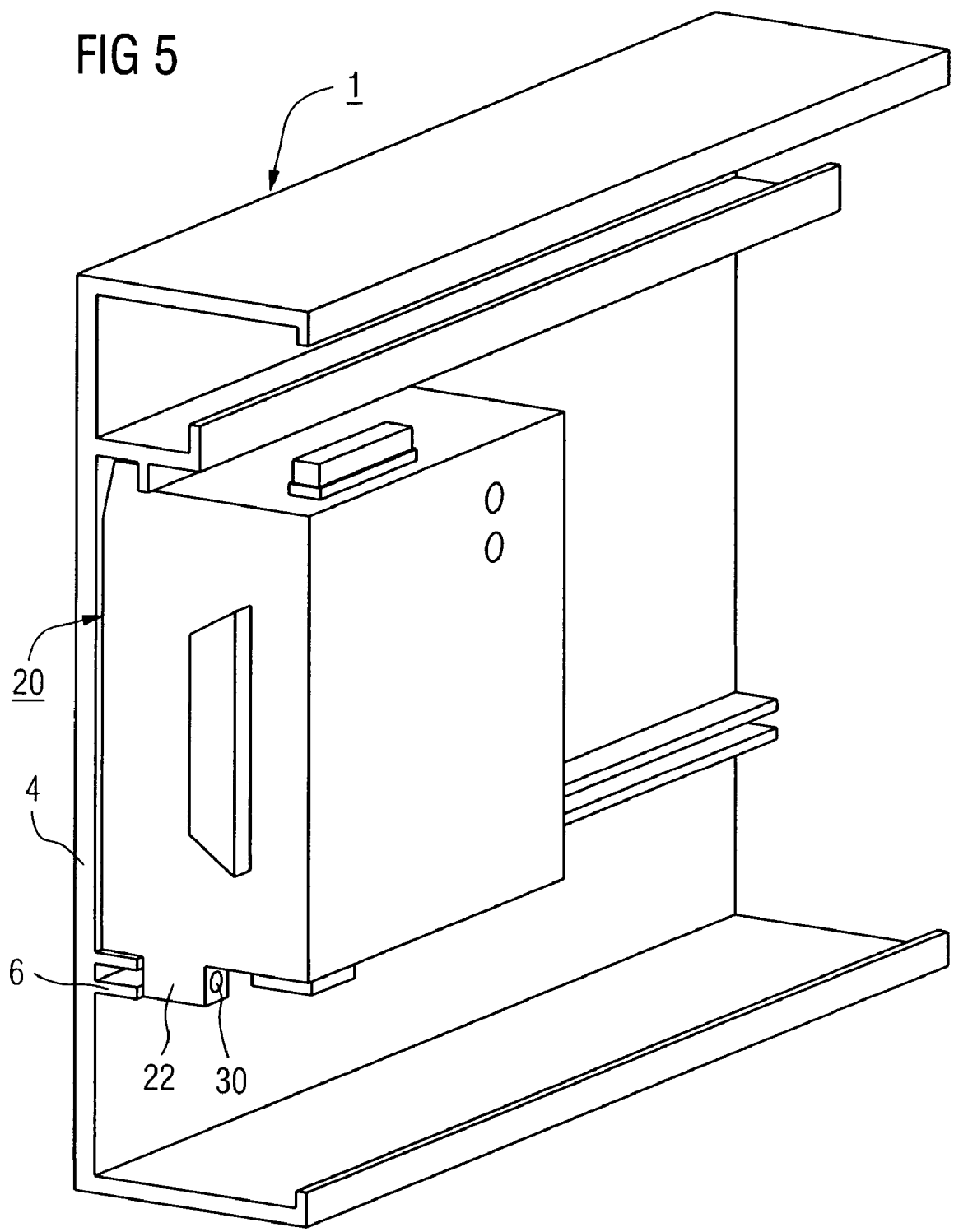
FIG. 5 shows the position of the apparatus after being attached in the mounting device.

FIG. 5 shows the position of the apparatus after being attached in the mounting device 1. Once the apparatus 20 is on the plate 4 and/or with the fastening device 22 and the fastening device 23 (not shown in FIG. 5) is on the mounting rail 6, then the apparatus 20 is fastened by means of conventional fastening means, in particular screws, by means of recess 30 with mounting rail 6, i.e., the screws are screwed into the mounting rail 6. Preferably an EMC shielding plate (not shown in FIG. 4 for the sake of simplicity) is situated between the mounting rail 6 and the fastening device 22 and/or 23. This plate is advantageously made of plastic, so that this EMC shielding plate ensures reliable diversion of interference signals to the mounting device 1, which is made of aluminum, for example, when the apparatus 20 is secured.

Figure 6:
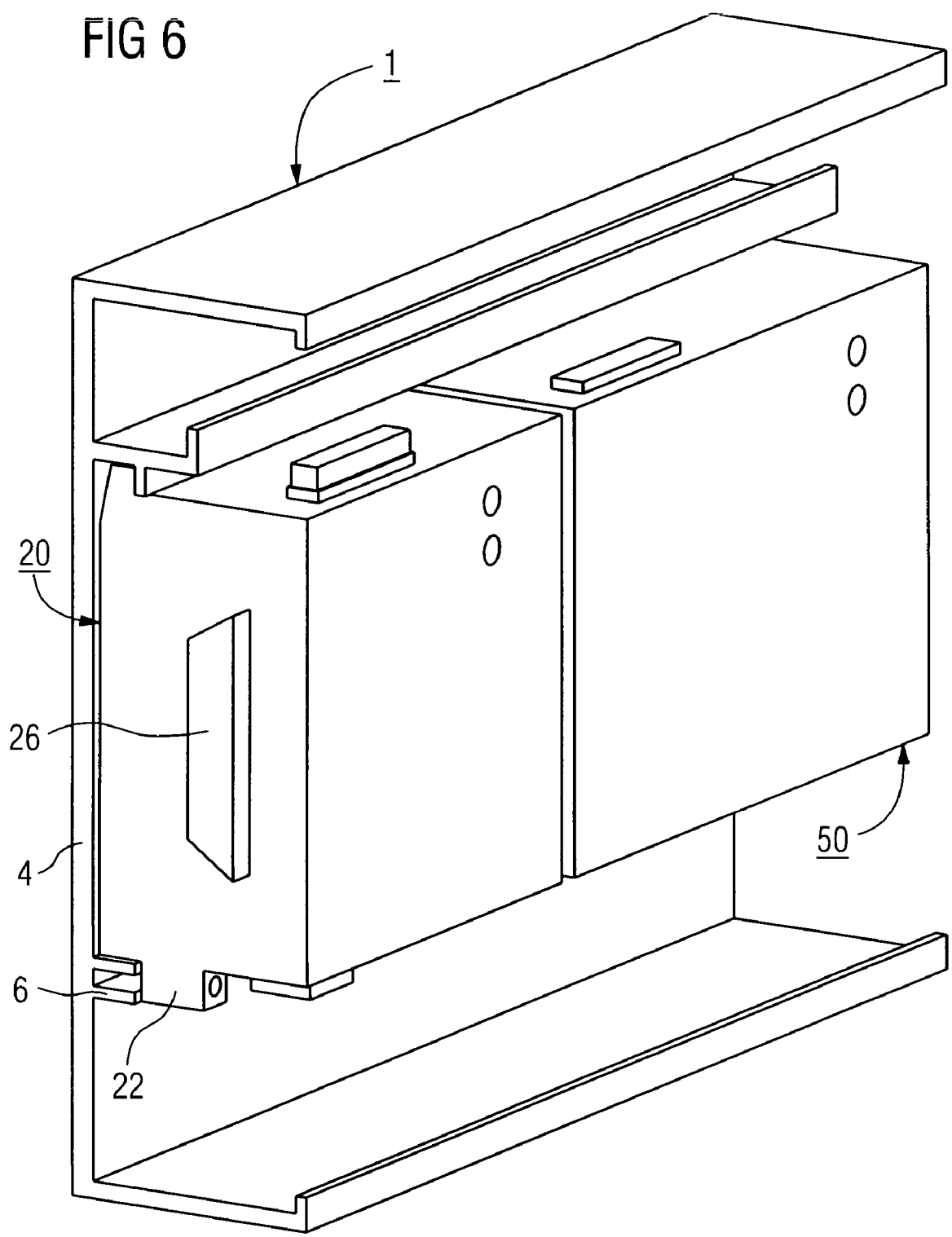
FIG. 6 shows the mounting device after two inventive apparatuses, for example, have been attached in it.

FIG. 6 shows the mounting device 1 after suspension of, for example, two inventive embodiments of apparatuses, namely apparatus 20 and apparatus 50. Apparatus 20 and apparatus 50 have different widths, for example. Apparatus 20 is inserted into the mounting device 1 and secured there according to the description of FIGS. 4 and 5. The apparatus 50 is inserted in the same way into the mounting device 1, first being pushed to the left and connected directly to the apparatus 20 by means of a lateral plug connection. This lateral plug connection is located in the side of the apparatus 20 which is opposite the side of the apparatus 20 which contains the lateral plug connection 26 and is not shown in FIG. 6. The apparatus 50 is then secured on the mounting rail 6 of the mounting device 1 according to the description of FIG. 5. Thus, depending on the width of the mounting device 1, any number of apparatuses can be inserted into such an inventive mounting device 1 and brought to the proper use position and secured there side by side with a direct interconnection. The mounting device 1, which can be cut to the required length, for example, can be attached to any surfaces.

In summary, the present invention relates to a mounting device 1, an apparatus 20 and an assembly system for the apparatuses, including those having a higher weight, whereby the individual parts can be secured by using a simple tool. The apparatuses 20, 50 are attached in a mounting device 1 and are secured on the mounting device 1 by means of fasteners. The mounting device 1 here has two integrated cable channels 12, 13 so that cables which cause interference, such as power supply cables, can be segregated from sensitive cables, such as data transmission cables, and so that the cables can be protected from ambient influences. To do so, the mounting device 1 is preferably provided with a front panel 6 as a cover. The design of the mounting device 1 with the front panel 6 as a closed unit offers a high level of EMC and ESD protection in addition to a high protective function against ambient influences and/or ambient conditions, in particular moisture and dust. Due to the inventive arrangement of the apparatuses 20, 50 side by side in the mounting device 1 with precisely defined positions, electric connections and/or coupling of the individual apparatuses 20, 50 among one another can be established easily through the use of plugs 26 arranged on the sides. Modules in the interior of the apparatuses 20, 50 can thus be connected directly to one another without any additional bus lines and/or bus modules.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A system, comprising:
a mounting device for at least one apparatus, comprising:
at least one plate;
a profile which is arranged perpendicular to the plate in a first half of the plate; and
a mounting rail which is situated perpendicular to the plate in a second half of the plate,
wherein the profile is configured for attaching the apparatus and the mounting rail is configured for securing the apparatus,
wherein the profile comprises a profile part which is connected to the plate, a first profile web, and a second profile web,
the first profile web and the second profile web each being arranged essentially perpendicular to the profile part, the second profile web being connected to a region of the profile part facing away from the plate, the first profile web being connected to the profile part between a region of the profile part with which the profile part is connected to the plate and the second profile web, and
the first profile web and the second profile web being arranged on opposite sides of the profile part, and
wherein the mounting rail comprises two parallel rails, which are attached with a given mutual distance to the plate.

2. System as claimed in claim 1,
wherein the mounting device further comprises at least one of an upper cover and a lower cover, the at least one cover being connected to the plate.

3. System as claimed in claim 2,
wherein the mounting device comprises an upper channel that is formed by the upper cover, the plate and the profile.

4. System as claimed in claim 2,
wherein the mounting device comprises a lower channel that is formed by the lower cover, the plate and an attached apparatus.

5. System as claimed in claim 4,
wherein the mounting device further comprises an upper channel that is formed by the upper cover, the plate and the profile; and
wherein the upper channel and the lower channel are each configured as channels for receiving cables.

6. System as claimed in claim 2,
wherein the mounting device comprises both the upper cover and the lower cover,
wherein the upper cover supports a first web which runs essentially perpendicular to the upper cover and essentially parallel to the plate, extends in a direction of the lower cover, and is situated on an end region of the upper cover which is not connected to the plate, and
wherein the lower cover supports a second web which runs essentially perpendicular to the lower cover and essentially parallel to the plate, extends in a direction of the upper cover, and is situated on an end region of the lower cover which is not connected to the plate.

7. System as claimed in claim 6,
wherein the mounting device further comprises a front panel configured to be slidingly received by the plate, the upper cover, and the lower cover, and
wherein the front panel comprises an upper profile and a lower profile configured to engage, respectively, the first web supported by upper cover and the second web supported by the lower cover of the mounting device.

8. System as claimed in claim 2,
wherein the mounting device comprises both the upper cover and the lower cover, and
wherein the mounting device further comprises a front panel which essentially forms a housing together with the plate, the upper cover, and the lower cover.

9. System as claimed in claim 8,
wherein the front panel comprises an upper profile and a lower profile configured to engage, respectively, the upper cover and the lower cover of the mounting device.

10. System as claimed in claim 1,
wherein the first profile web is arranged essentially parallel to the plate.

11. System as claimed in claim 1,
wherein the second profile web is arranged essentially parallel to the plate.

12. System as claimed in claim 1,
wherein the profile is manufactured as one integral piece.

13. System as claimed in claim 1,
wherein the mounting device is one integral piece of extruded aluminum profile.

14. A system, comprising:
a mounting device for at least one apparatus, comprising:
at least one plate;
a profile which is arranged perpendicular to the plate in a first half of the plate;
a mounting rail which is situated perpendicular to the plate in a second half of the plate; and
an apparatus configured to attach to the mounting device,
wherein the profile is configured for attaching the apparatus and the mounting rail is configured for securing the apparatus,
wherein the profile comprises a profile part which is connected to the plate, a first profile web, and a second profile web,
the first profile web and the second profile web each being arranged essentially perpendicular to the profile part, the second profile web being connected to a region of the profile part facing away from the plate, the first profile web being connected to the profile part between a region of the profile part with which the profile part is connected to the plate and the second profile web, and
the first profile web and the second profile web being arranged on opposite sides of the profile part,
wherein the apparatus comprises an apparatus web on at least a first apparatus side along the entire side, the apparatus web configured to engage the profile, and
wherein the apparatus further comprises at least one fastening device on a second apparatus side, the fastening device configured to attach the apparatus to the mounting rail.

15. System as claimed in claim 14, wherein the apparatus is an electric apparatus.

16. System as claimed in claim 14,
wherein the apparatus web protrudes out of a lateral plane of the first apparatus side.

17. System as claimed in claim 14,
wherein the fastening device protrudes out of a lateral plane of the second apparatus side, and is formed as a cube, and wherein the fastening device is configured to receive a fastener.

18. System as claimed in claim 14,
wherein the apparatus web and the fastening device are situated on opposite sides of the apparatus.

19. System as claimed in claim 14,
wherein the apparatus comprises at least one of an upper plug connection situated on the first apparatus side, on which the apparatus web is situated, and a lower plug connection situated on the second apparatus side, on which the fastening device is situated.

20. System as claimed in claim 14,
wherein the apparatus comprises at least one lateral plug connection situated on a side of the apparatus orthogonal to the first apparatus side, on which the apparatus web is situated.

21. System as claimed in claim 14,
wherein the apparatus comprises at least one signaler, by which information regarding a current operating state of the apparatus is signaled.

22. System as claimed in claim 21,
wherein the signaler comprises a light-emitting diode.

23. System as claimed in claim 14, further comprising:
a further apparatus configured to attach to the mounting device with the first apparatus.

24. System as claimed in claim 23, wherein the first apparatus comprises at least one lateral plug connection situated on a side of the first apparatus orthogonal to the first apparatus side, on which the apparatus web is situated, and
wherein the lateral plug connection is configured to connect to the further apparatus.

25. System as claimed in claim 14,
wherein a fastener connects the fastening device of the apparatus to the mounting rail of the mounting device.

26. A mounting device, comprising:
at least one plate;
a profile extending from the plate in an upper region of the plate; and
a mounting rail extending from the plate in a lower region of the plate,
wherein the profile is configured for attaching an electronic apparatus and the mounting rail is configured for securing the apparatus,
wherein the profile comprises a profile part which is connected to the plate, a first profile web, and a second profile web,
the first profile web and the second profile web each extending from the profile part, the second profile web arranged in a first region of the profile part distal from the plate, the first profile web arranged in a second region of the profile part between a third region of the profile part where the profile part is connected to the plate and the first region, and
the first profile web and the second profile web being arranged on opposite sides of the profile parts,
wherein the mounting rail comprises two parallel rails, which are attached with a given mutual distance to the plate.

27. Electronic apparatus, comprising:
an apparatus web extending along essentially a full length of at least a first apparatus side and configured to engage a mounting device, and
at least one fastening device provided on a second apparatus side, the fastening device configured to attach the apparatus to a mounting rail,
wherein the mounting rail comprises two parallel rails, which are attached with a given mutual distance to a plate on the mounting device.

* * * * *